United States Patent [19]

Fortune

[11] 4,055,744
[45] Oct. 25, 1977

[54] ELECTRICALLY HEATED SOLDERING-DESOLDERING INSTRUMENTS

[76] Inventor: William S. Fortune, 14250 Dearborn St., Panorama City, Calif. 91402

[21] Appl. No.: 596,395

[22] Filed: July 16, 1975

[51] Int. Cl.² .......... H05B 1/02; H05B 3/42; B23K 3/02; B23K 3/04
[52] U.S. Cl. .................. 219/239; 219/229; 219/241; 219/533; 219/534; 228/54; 228/55
[58] Field of Search .......... 219/221, 227–242, 219/533, 534, 536; 228/51–55; 30/140

[56] References Cited

U.S. PATENT DOCUMENTS

| | | | |
|---|---|---|---|
| 1,968,867 | 8/1934 | Angell | 219/239 X |
| 2,119,908 | 6/1938 | Ellis | 219/229 |
| 2,179,818 | 11/1939 | Hampton et al. | 219/239 |
| 3,286,076 | 11/1966 | Finch | 228/55 X |

Primary Examiner—A. Bartis
Attorney, Agent, or Firm—Daniel T. Anderson

[57] ABSTRACT

An improved soldering-desoldering instrument is disclosed which includes a stainless steel, thin walled sheath having a front end which is both internally and externally threaded: internally for securing the electric heater cartridge, and externally for securing the soldering tip, all in very high thermal energy flow relation. The rear of the sheath is formed integrally with a hexagonal nut to facilitate the indicated threaded assembly and disassembly.

3 Claims, 35 Drawing Figures

ELECTRICALLY HEATED SOLDERING-DESOLDERING INSTRUMENTS

BACKGROUND OF THE INVENTION

This invention relates generally to soldering or desoldering instruments and particularly relates to soldering tips therefor.

The soldering tip for a soldering instrument must conduct heat from the heater element of the instrument to a component to be soldered in an efficient manner. In addition, the solder tip should readily be wet by the solder compound. Furthermore, it needs to be easily cleaned and should not corrode at the usual soldering temperature due to the influence of flux and other corrosive chemicals.

To this end soldering tips are usually manufactured with a copper core which readily conducts heat. On the other hand, the copper easily corrodes and does not readily wet solder. Therefore, the copper core has conventionally been plated with a metal such as iron, steel or stainless steel. However, the plating process is fairly complicated and not easily controlled. For that reason, it has proven to be expensive. In addition, with this process it is first necessary to shape the copper core to the desired final form which may include a wedge-shaped tip. Further, for different operations solder tips of different sizes are necessary and this in turn means that a relatively large inventory of tips must be kept, each of which must be individually plated.

Furthermore, when a copper core is plated with iron or steel the wall thickness must be uniform and cannot be varied. This may be desirable in certain cases because the wall thickness determines the ease of heat transfer between the copper core and the outer shield: on the other hand, the outer shield provides mechanical rigidity and may have to be thicker at certain areas.

Another problem encountered in soldering instruments is the removal of the solder tip. It may either be necessary to remove a worn out tip and to replace it or alternatively, it may be desired to perform another soldering operation requiring a different type of solder tip.

Frequently, however, and particularly after extended use, the threads of the tip seize to the stainless steel sheath which conventionally surrounds the heater element. Therefore, considerable force may have to be used to remove the solder tip which in turn may damage the heater and hence necessitate replacement of the entire front end of the instrument.

For certain applications of temperature-controlled soldering instruments it may be necessary to operate the controlling electronics at relatively low voltage and high current. This may be necessary when the instrument is operated with dc line voltage. In this case, the silicon-controlled rectifier or power transistor of the instrument may generate considerable heat. Since these components are usually found in the handle of the instrument this may make it difficult to hold the instrument and may eventually damage the handle.

Therefore, a suitable heat sink is desirable to conduct the heat away from the handle, for example, along the cord of the instrument.

Finally, for the assembly of complicated components or for industrial applications it may be desirable to keep a record of the temperatures at which each component has been soldered. Therefore, a temperature sensor would be desirable which permits to display the temperature either by an oscilloscope or a strip chart recorder.

It is accordingly an object of the present invention to provide a solder tip for a soldering instrument which is laminated but which need not be plated.

A further object of the present invention is to provide a solder tip of the type discussed which after lamination with a suitable iron or steel can be further worked into a desired shape so that different forms of solder tips can be made from the same blanks.

Another object of the present invention is to provide a construction of the solder tip and associated sheath for holding the heater cartridge and heater which permits easy removal of the solder tip which may have seized without damage to the heater cartridge and the cartridge.

Yet another object of the present invention is to provide a sheath for the heater cartridge and heater which features rolled threads and a laminated construction to improve the heat transfer to the solder tip and facilitate its removal.

Still a further object of the present invention is to provide a temperature-controlled soldering instrument provided with two temperature sensors, one for controlling its temperature and the other for permitting a display of the actual temperature of the heater.

Still another object of the present invention is to provide an extra temperature sensor to permit digital temperature readout and sensitivity control of the readout in accordance with different solder tips.

SUMMARY OF THE INVENTION

In accordance with the structural features of one example of the present invention, these and other objects are achieved in a soldering instrument which includes a thin-walled stainless steel sheath having a front end formed with both internal and external threads and a rear end formed with an externally exposed hexagonal unit. A heater cartridge is threaded into the internal threads and a soldering tip is threaded onto the external threads whereby the cartridge and tip are in excellent thermal energy exchange relation. An electrical heating element is disposed within the cartridge in direct thermal contact therewith.

It should be noted that in the following specification and claims the term "solder instrument" is meant to include both a soldering as well as a desoldering device.

The novel features that are considered characteristic of this invention are set forth with particularly in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
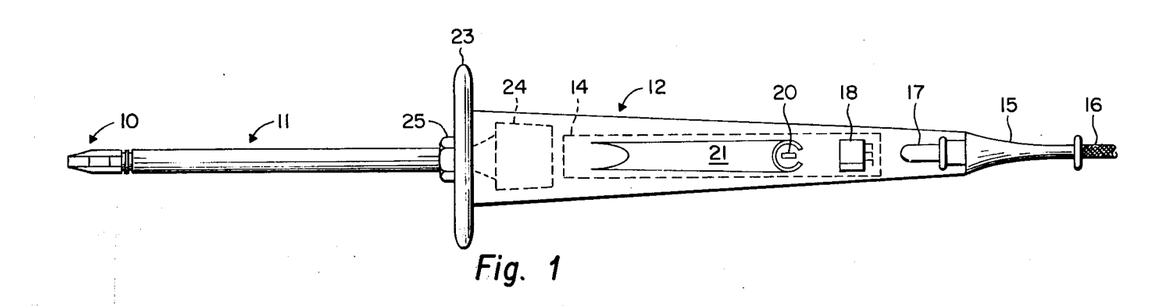
FIG. 1 is a plan view of an example of a soldering and desoldering instrument of the present invention.

Referring now to the drawings and particularly to FIG. 1, there is illustrated by way of example a temperature-controlled soldering instrument. This instrument may, for example, be of the type disclosed and claimed in applicant's prior U.S. Pat. No. 3,883,716 of May 13, 1975. The instrument generally includes a solder tip 10, a heater element sleeve or sheath 11 and a handle or housing 12 for a circuit board 14 which supports the active and passive elements of the electronic temperature control circuit of the invention. The instrument further includes a cord holding element 15 which may be flexible or yieldable and through which a cord 16 extends. The core 16 extends into the handle 12 as shown at 17.

The circuit board 14 may bear a heat-generating active element 18 which may, for example, be a power transistor or a silicon-controlled rectifier. A control knob 20 extends through the handle for setting the temperature in the manner explained in Applicant's prior patent. The handle 12 may have a flat portion 21 for ease of manufacture. The circuit board 14 is guided by internal grooves in the handle.

The instrument includes a yieldable annular element or ring 23 which fits over the end of the handle. A locking bushing 24 may be provided for locking the heater element sleeve 11 to the handle 12. The sleeve 11 is preferably provided with an integral nut 25.

Figure 2:
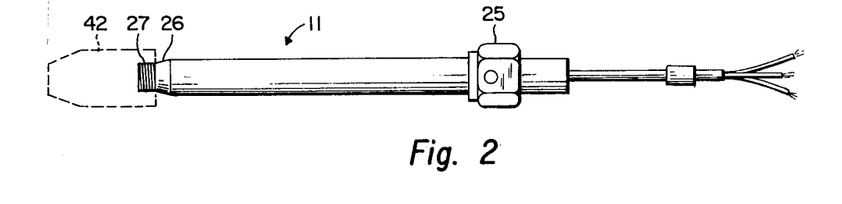
FIG. 2 is an enlarged plan view of a sheath housing the heater cartridge and heater and to which a solder tip may be connected by threads.
Figure 3:
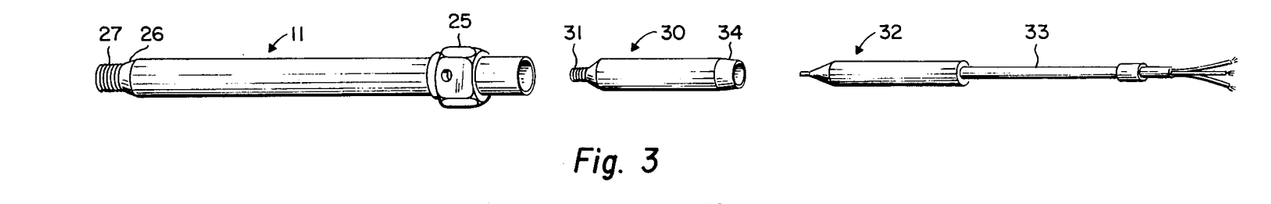
FIG. 3 is an exploded view of the sheath and associated parts of FIG. 2 and separately showing the sheath, the cartridge, the heater and its leads.
Figure 4:
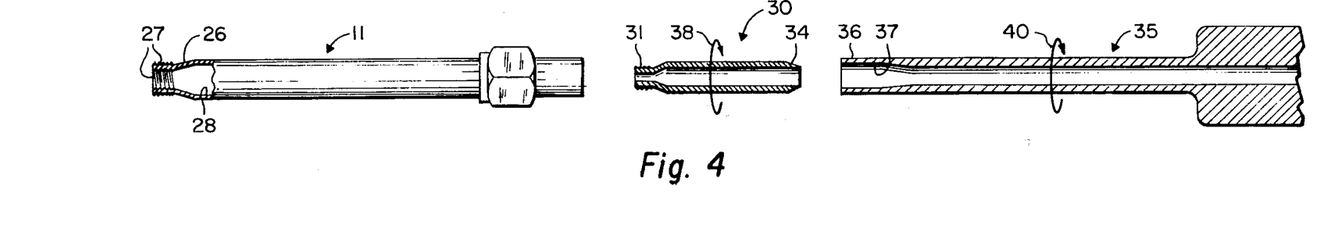
FIG. 4 is an exploded view, partly in cross-section and illustrating an insertion tool for inserting or removing the heater cartridge into or from its sheath.

Referring now to FIGS. 2 – 4 there is illustrated the sleeve 11 for the heater element provided with the integral nut 25 at its rear end. The sleeve 11 preferably consists of stainless steel to minimize corrosion and to make it heat resistant. Its front end 26 is of reduced diameter and provided with threads 27 which are so arranged that they permit to thread both an external and internal member thereto.

As clearly shown in FIG. 4, the sleeve 11 has a substantially uniform inner diameter 28 except for the front portion 26 which has a smaller diameter.

The sleeve 11 is adapted to receive a heater cartridge 30. The external diameter of the heater cartridge 30 is such that it will fit into the sleeve 11. Its front end is provided with external threads 31 of reduced diameter which will mate with the internal surface of the threads 27 of the sleeve 11 when the element cartridge has been introducd.

The heating element 32 fits the heater cartridge 30 and may consist of a coated ceramic material containing the heater wires. The insulated leads or cords for the heater element 32 are shown at 33.

It should be noted that the rear portion of the heater cartridge 30 is provided at its rear end with an outer conical section 34 which serves the purpose to permit to insert the heater cartridge 30 into the sleeve 11. To this end there may be provided an insertion tool 35 illustrated in FIG. 4. The insertion tool is hollow as shown and has at its front end 36 an inner conical portion 37 which fits over the outer conical rear portion 34 of the heater cartridge 30.

Thus as indicated in FIG. 4 by the arrows 38 and 40, the heater cartridge 30 is introduced into the sleeve 11 and rotated in a right-hand direction by means of the insertion tool 35. Thus the insertion tool is lightly pressed against the heater cartridge 30 so that the cartridge can be threaded into the internal threads 27 of the sleeve 11. At the same time, the heater element 32 should be inserted into the cartridge 30 with the cord 33 extending through the hollow portion of the insertion tool.

After the cartridge 30 has been securely threaded the insertion tool 35 may readily be removed by an additional rotation which will disconnect the two elements from each other. In order to remove the heater cartridge 30 the insertion tool is again inserted into the sleeve 11 and a tight fit provided which then makes it possible to unthread the two elements, that is the sleeve 11 from the cartridge 30.

As shown in dotted lines in FIG. 2, a solder tip 42 may be threaded to the outer thread 27 of the sleeve 11. As explained hereinbefore, the solder tip frequently seizes and considerable force may be required to remove it from the sleeve 11. To this end there is provided the nut 25 which is made integral with the sleeve 11 and which preferably is a hexgonal nut. Hence, the tip may be removed by holding the nut 25 with a suitable hand wrench and by using pliers to unscrew the solder tip 42. In order to facilitate efficient removal of the solder tip it should only be screwed on finger tight. The sleeve 11 has sufficient mechanical rigidity to resist the torque generated when the tip 42 is removed.

Figure 5:
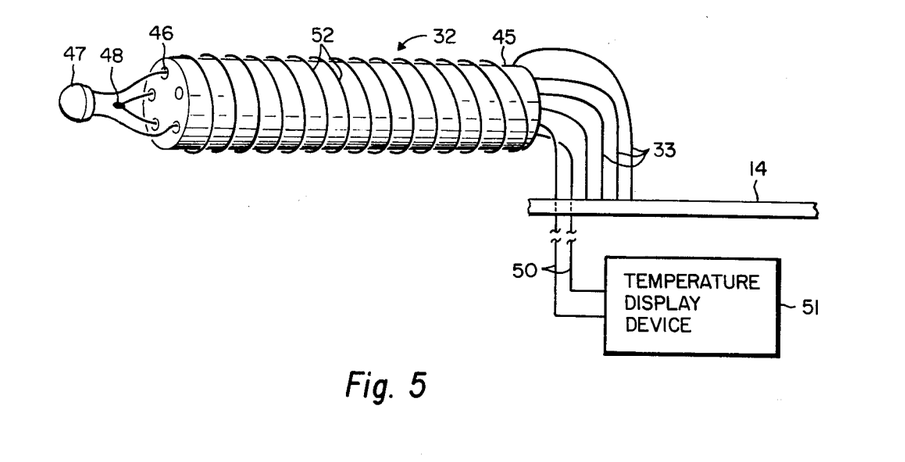
FIG. 5 is an elevational view of a heater wound about a ceramic core and provided with a thermistor and a thermocouple as temperature sensors and including a schematic view of a temperature display device.

Referring now to FIG. 5, there is illustrated the heater element 32 which may be provided with one or two temperature sensors. One sensor is for the purpose of controlling the temperature of the heater element. The other temperature sensor serves the purpose to generate a voltage which may be used for displaying the temperature of the heater. It will be understood that a single sensor may be used for both purposes.

The heater element 32 may consist of a ceramic core 45 which may be provided with a plurality of longitudinal holes 46. One of the sensors 47 may serve the purpose to control the temperature of the heater element in the manner disclosed in applicant's prior patent. The sensor 47 may, for example, consist of a thermistor. The other sensor 48 may serve the purpose to generate a voltage which may be applied by leads 50 to a temperature display device 51. This may, for example, consist of an oscilloscope for exhibiting the temperature of the heater, that is the temperature of the solder tip. On the other hand, if a permanent record is desired a recorder such as a strip chart recorder may be provided.

This will provide an indication on a continuous basis of the temperature at which each unit has been soldered. This may prove to be of importance for control purposes or for checking a large number of units made on an industrial basis. By way of example, the leads for the two temperature sensing devices 47 and 48 may extend through the holes of the ceramic core 45. The electric resistance wire is shown at 52 and may be wrapped around the ceramic core which may subsequently be coated with a suitable material. The circuit board 14 is also shown in FIG. 5 which carries the electric circuit for the temperature control.

As previously referred to, in certain cases the instrument may have to be operated at a low voltage and high current. This may occur for either ac or dc operation. In that case, the element 18 becomes a heat-generating element and its heat may have to be rapidly removed from the handle 12 to prevent damage to the handle and to prevent the operator from dropping the instrument when its handle gets too hot to be conveniently gripped.

Such a flexible heat sink has been illustrated in FIGS. 6 – 9 to which reference is now made. The instrument is provided again with a cord or cable 16 upon which may be provided a metallic braid 54 consisting of any metal which readily conducts heat such as copper or aluminum. The braid 54 may be slid over the insulation of the line cord 16 and may extend over approximately 6 inches to provide sufficient heat dissipation.

Figure 6:
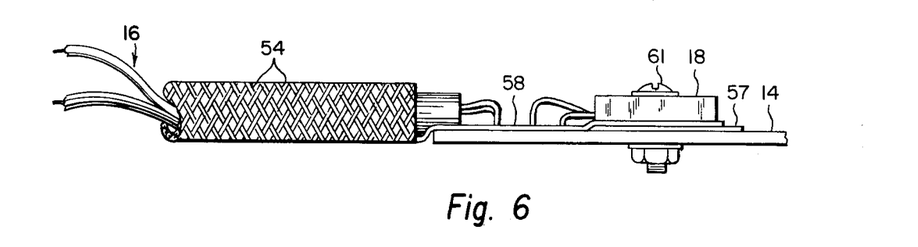
FIG. 6 is a side elevational view of the cord of a soldering instrument and a portion of its circuit board illustrating a flexible heat sink consisting of a metal braid disposed about the cord and extending to an active heat-generating element.

The cord 16 is electrically connected to the circuit board 14 upon which is mounted the heat generating element 18 which, as explained before, may be a power transistor or silicon-controlled rectifier.

Figure 7:
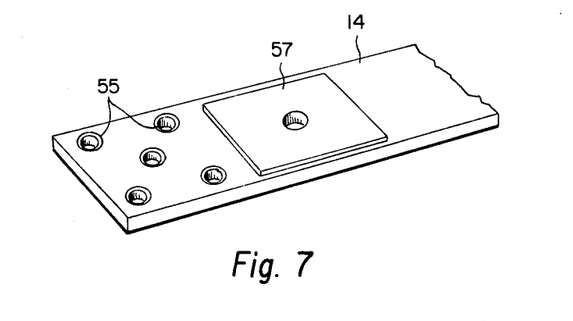
FIG. 7 is a view in perspective of a portion of the circuit board of FIG. 6 showing an additional heat sink provided by a copper layer.

As shown particularly in FIG. 7, the circuit board 14 may be provided with a plurality of circuit pads 55 which may consist of copper and to which the input leads 56 of the cord may be connected to supply power to the instrument.

Preferably, but not necessarily, a heat sink 57 is provided on the circuit board 14 and this heat sink may consist of a sheet of copper. It is provided between the element 18 and the circuit board 14.

Figure 8:
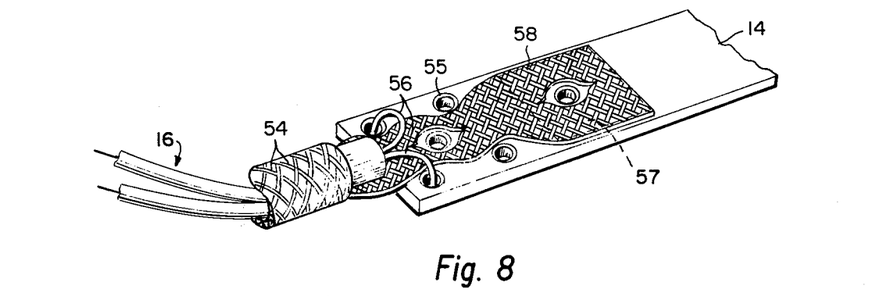
FIG. 8 is a view in perspective similar to that of FIG. 7 but showing the cord and its braid applied thereto, the braid extending over a portion of the circuit board.

In addition, a portion 58 of the braid 54 is flattened and extended over the circuit board 14 below the position of the element 18. It will, of course, be understood that the forward portion 58 of the braid 54 must be so arranged that it does not make electric contact with the circuit pads 55. As clearly shown in FIG. 9, three leads 60 extend from the element 18 into the circuit board.

Figure 9:
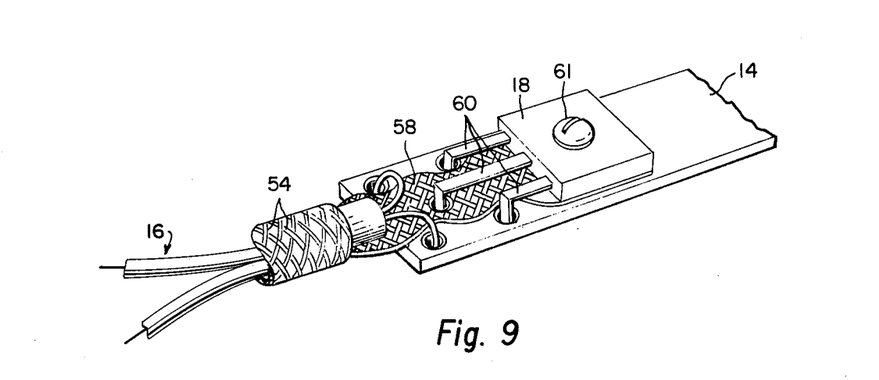
FIG. 9 is a view in perspective similar to that of FIG. 8 and illustrating the leads and heat-generating element connected to the circuit board.

Finally, the element 18 may be secured to the circuit board 14 by a nut and screw 61, thereby to provide good thermal contact between the element 18, the forward braid portion 58 and the copper heat sink 57.

It will be evident now that a flexible heat sink has been provided which will rapidly dissipate heat generated by the element 18. There will, of course, be a certain temperature gradient between the element 18 and the outer end of the braid 54 on the cord 16. It will also be evident that the cord 16 has to be insulated in the usual manner. Because the braid, as well as the cord, are flexible the heat sink in essence is flexible and will not impede the mobility of the instrument.

Referring now generally to FIGS. 10 – 30, there are illustrated various solder tips which may be manufactured in accordance with the process of the present invention. These solder tips are characterized by having a copper core and a cap consisting of steel or iron, that is preferably of so-called Armco iron. This material is conventionally used for transformer cores. It is characterized by its resistance to corrosion, for example to solder flux, at elevated temperatures. It also is readily wetted by solder and is easy to clean.

Thus referring specifically to FIGS. 10 – 13 there is illustrated in a number of steps the manufacture of a large spade solder tip. The solder tip comprises a copper core 63 which has a conical forward end 64, an intermediate cylindrical portion 65, a portion 66 forming a reverse cone forming a small angle with a central axis and a hollow rear portion 67 of enlarged diameter provided with internal threads 68 for attachment to the heater sleeve 11.

Figure 10:
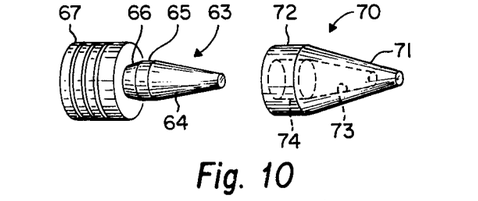
FIG. 10 is a perspective view of a copper core and cap or jacket to be assembled.

Also shown in FIG. 10 is a thin-walled cap or jacket 70 preferably made of Armco steel. It has a shape to fit the copper core 63 and hence is provided with a forward conical portion 71 and a rearward cylindrical portion 72. Its interior is hollow as shown at 73 to accept the conical portion 64 and also has a hollow cylindrical rear portion 74 to fit over the cylinder 65 and cone 66 of the core 63.

Figure 11:
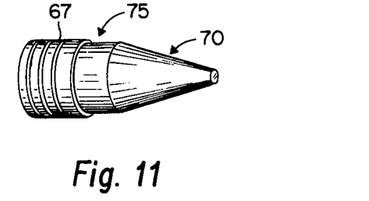
FIG. 11 illustrates the assembled structure which is a composite solder tip.
Figure 12:
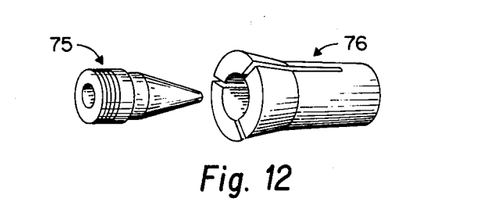
FIG. 12 is a view in perspective of the structure of FIG. 11 and a crimping device such as a lathe collet.
Figure 13:
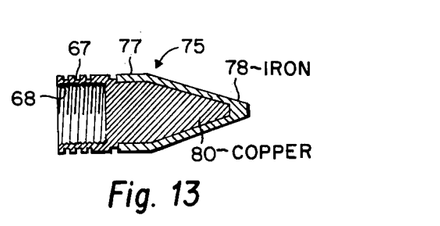
FIG. 13 is a cross-sectional view of the finished tip after the crimping operation.
Figure 14:
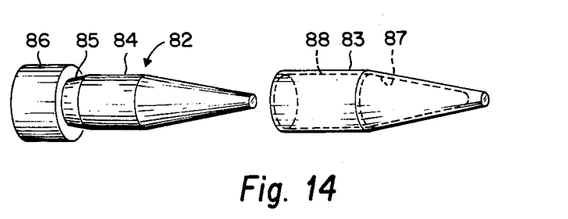
FIG. 14 is a perspective view of another copper core and iron tip of different construction.

The core 63 and cap 70 are now assembled as shown in FIG. 11 with the cap providing a tight fit with the core. Thus a laminated or composite structure 75 is formed which has a front end entirely surrounded by the cap 70. The laminated structure 75 consisting of core 63 and cap 70 is now connected, for example, by crimping it by a suitable crimping device 76 which may take the form of the collet of a lathe. Hence when the collet is tightened, the cylindrical rear portion 72 of the cap 70 is pressed against the rear portion of the copper core 63, whereby the rear portion of conical shape 66 becomes cylindrical due to the flow of the copper. The finished structure is shown in FIG. 13 and has a uniformly cylindrical rear portion 77 with a steel cap 78 and a copper core 80. The rear portion 67 remains unchanged and has internal threads 68.

Thus, the reverse bias portion 66 of the copper core simply facilitates the connecting or crimping and permits a portion of the copper to flow toward the rear.

The unclad portion 67 of the copper may be plated with a suitable metal. For example, the plating may be done with nickel or with hard chromium or with both. If the rear portion is only plated with chromium the plating may be done before the shaping or working of the solder tip. If it is only plated with nickel it preferably is done after the working of the solder tip.

Another embodiment of the present invention is illustrated in FIGS. 14 – 21 to which reference is now made. This will provide a so-called small spade solder tip or dip tip. As shown in FIG. 14, there is again provided a copper core 82 and a steel or Armco iron cap 83. The copper core 82 may have an elongated forward conical portion, a cylindrical intermediate portion 84, a rear conical portion 85 as previously disclosed, and an internally threaded cylindrical rear portion 86. The cap 83 has an internal shape 87 to accept the copper core and again has a conical forward opening and a rearward cylindrical opening 88.

Figure 15:
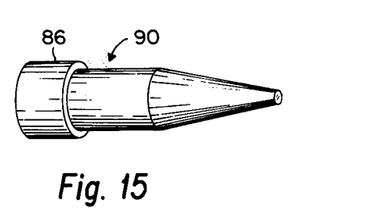
FIG. 15 is a view in perspective of the assembled structure having an enlarged cylinder at its rear end.
Figure 16:
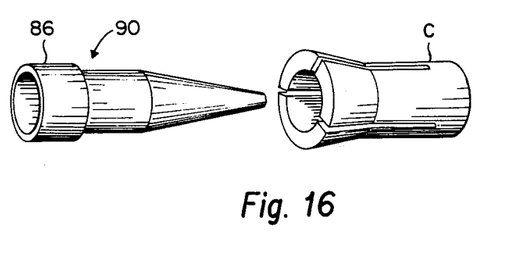
FIG. 16 is a view in perspective of the structure of FIG. 15 and a collet for crimping the rear portion of the laminated structure.
Figure 17:
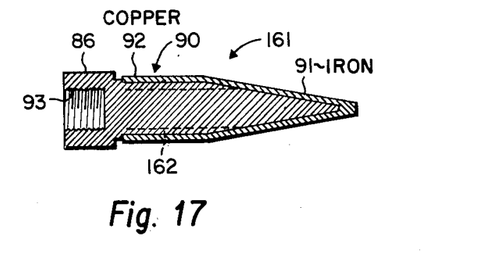
FIG. 17 is a cross-sectional view of the structure after crimping.

The two portions are now assembled in the manner previously described as shown in FIG. 15 to provide a composite or laminated structure 90. The structure 90 may again be crimped by the collet c as shown in FIG. 16 or otherwise connected and the resulting product is shown in FIG. 17. The structure has an elongated conical forward section 91, a cylindrical intermediate section 92 and the original rear section 86 with internal threads 93.

Figure 18:
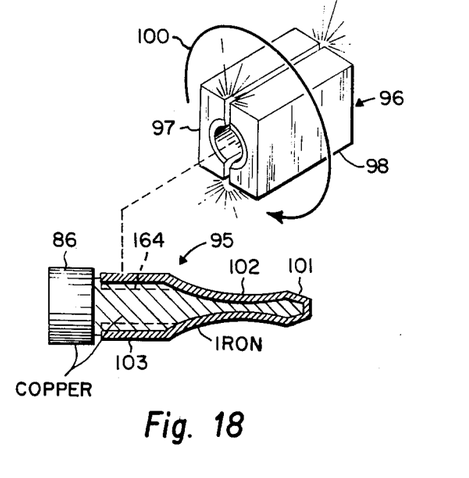
FIG. 18 is a cross-sectional view of the structure of FIG. 17 which has been elongated by hammering which may be effected by a swedging device.

As illustrated in FIG. 18, the composite structure 90 is now shaped to provide the structure 95. This may be effected by hammering or peening by hand or by the swedging machine 96. This consists of two portions 97 and 98 between which the structure 95 is inserted. The entire structure is then rapidly hammered while being rotated about the solder tip as shown by the arrow 100.

As a result the structure 95 has a forward conical portion 101 and an intermediate concave portion 102 with a cylindrical intermediate portion 103.

Figure 19:
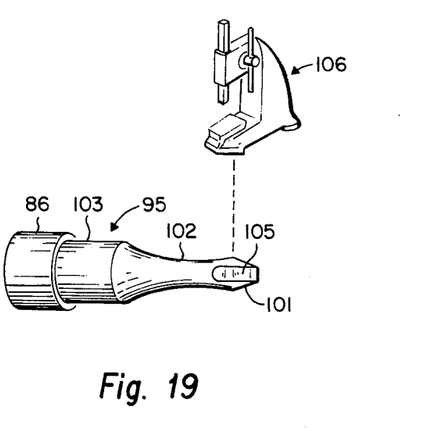
FIG. 19 is a view in perspective of the solder tip shape of FIG. 18 provided with a flat wedge as shown schematically by a press.

As shown in FIG. 19, the structure 95 may additionally be provided with a wedge shape shown at 105 and this may be effected by the press 106 which will flatten out two sides of the forward portion 101 of the solder tip.

Figure 20:
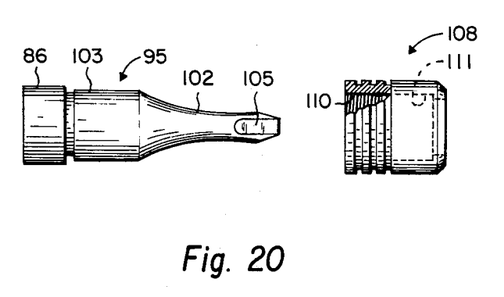
FIG. 20 is a plan view of the solder tip of FIG. 19 with a stainless steel collar partly in section.

The finished structure 95 may now be provided with a stainless steel sleeve 108 having internal threads 110 at its rear portion and an internal diameter to fit over the rear portion 86 of the solder tip 95. It is provided with a shoulder 111 to be retained by the rearward cylinder 86 so that the locking sleeve 108 may be screwed onto the heater sleeve 11.

Preferably, the locking sleeve 108 is made of stainless steel and it may be coated with an anti-seize compound. Such a locking sleeve has the advantage that the soldering tip need not be directly removed from the heater sleeve 11, but only the locking sleeve 108 need to be unscrewed. Since the sleeve 108 consists of stainless steel it is mechanically strong and can be made resistant to seizing.

Figure 21:
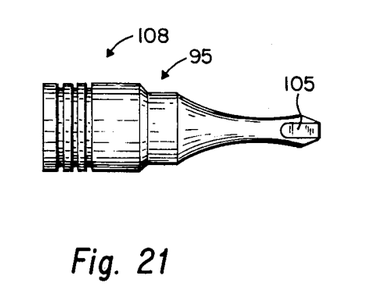
FIG. 21 illustrates the assembled structure of FIG. 20.

The finished structure 95 with the attached locking sleeve 108 is illustrated in FIG. 21.

Figure 22:
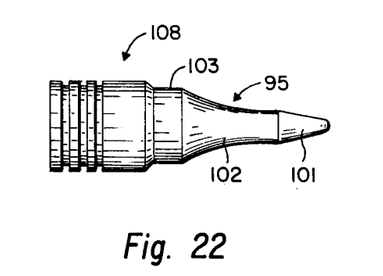
FIG. 22 is a plan view of a structure similar to that of FIG. 21 but without the flat wedges.

As shown in FIG. 22, the step of providing a wedge shape 105 as shown in FIG. 19, may be omitted. Otherwise the structure of FIG. 22 is identical to that of FIG. 21.

Figure 23:
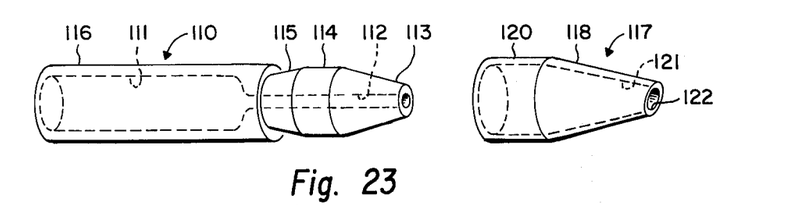
FIG. 23 is a view in perspective of a hollow copper core and a spaced cap therefor having a slanted end.
Figure 24:
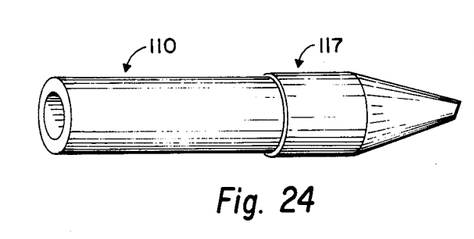
FIG. 24 is a view in perspective of the assembled structure of FIG. 23.
Figure 25:
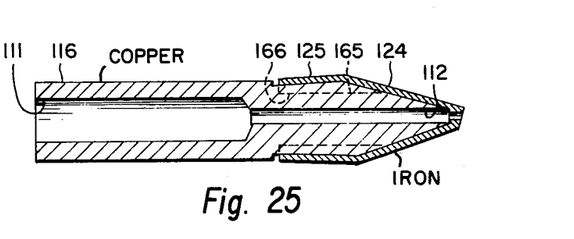
FIG. 25 is a cross-sectional view of the structure of FIG. 24.

The manufacture of a solder tip which may be used for both soldering and desoldering is illustrated in FIGS. 23 – 25. Thus, FIG. 23 illustrates a copper core 110 which is provided with a longitudinal opening 111, 112 therethrough. The copper core 110 again has a forward portion 113 of conical shape and an intermediate portion 114 of cylindrical shape and a succeeding portion 116 having a reverse bias. The rear portion 116 is relatively elongated or cylindrical and provided with a relatively large internal opening 111 while the forward opening 112 is of smaller diameter. The corresponding cap 117 has a forward conical portion 118 and a rearward cylindrical portion 120 and an internal opening 121 which will fit over the portions 113 – 115. It is also provided with a slanted forward tip 122.

The two portions 110 and 117 are shown assembled in FIG. 24 while FIG. 25 shows a cross-section after crimping. The finished structure of FIG. 25 has a forward conical portion followed by an intermediate conical portion 125 of reverse bias and followed by the original cylindrical portion 116 with its cylindrical opening 111.

The solder tip of FIG. 25 may be used for both soldering and desoldering operations. Air and melted solder may be sucked in through the opening 112, 111 for desoldering. The large opening 111 provides a plenum for the air. Alternatively, hot air may be expelled through the openings 111 and 112 for various purposes such as for drying purposes, shrinking plastic tubing, forming plastics and the like.

Figure 26:
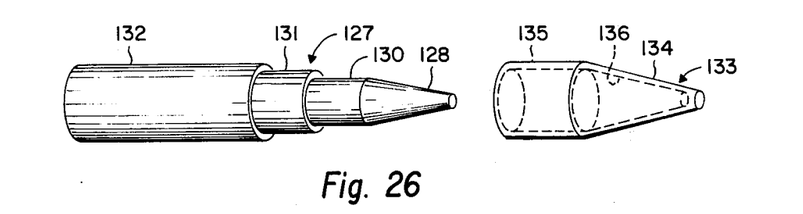
FIG. 26 is a view in perspective of a heavy duty copper core with a spaced cap.
Figure 27:
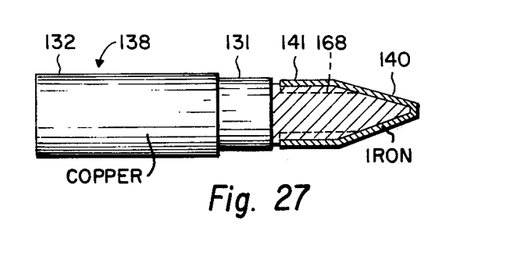
FIG. 27 is a plan view partly in cross section of the assembled and crimped device.
Figure 28:
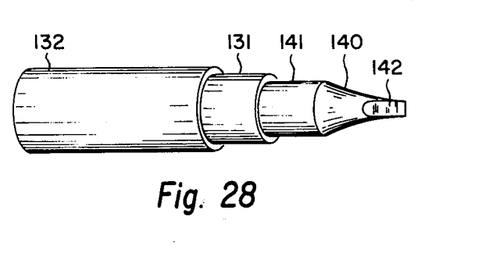
FIG. 28 is a view in perspective of the solder tip of FIG. 27 provided with a flat wedge-shaped tip.

A heavy duty solder tip is illustrated in FIGS. 26 – 28. It comprises a heavy duty copper core 127. The copper core has a forward conical portion 128 followed by a cylindrical portion 130 which in turn is followed by two cylindrical portions 131 and 132 of successively larger diameters. The corresponding cap 133 again has a conical forward portion 134 and a cylindrical rearward portion 135 and an internal opening 136 to fit over portions 128 and 130 of the copper core.

After crimping the composite structure 138 is shown in FIG. 27. It comprises a forward conical portion 140 followed by a cylindrical portion 141. The two cylindrical rear portions 131 and 132 remain unchanged. The forward end 140 may again be provided with a flat wedge 142 in the manner previously described and illustrated in FIG. 28.

The heavy duty copper core operates as a heat accumulator and hence will tend to maintain the solder tip at an equal temperature even under conditions of heavy use.

Figure 29:
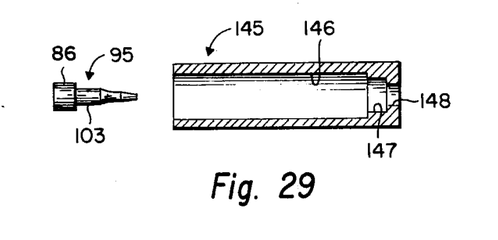
FIG. 29 is a plan view of a solder tip and a cross-sectional view of a locking collar therefor.
Figure 30:
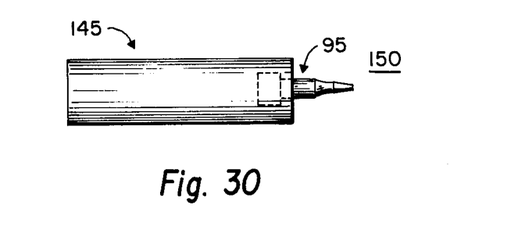
FIG. 30 is a plan view of the assembled device of FIG. 29.

Instead of utilizing a heavy duty copper core it is also feasible to provide a locking collar which serves the purpose of heat accumulator. This is illustrated in FIGS. 29 and 30 to which reference is now made. As shown in FIG. 29, there may be a solder tip which may, for example, be the solder tip 95 of FIG. 18. It will, of course, be understood that any other type of solder tip may be used instead. The solder tip 95 now cooperates with a locking collar 145, which has an external cylindrical shape, a large rearward cylindrical opening 146 and two adjacent cylindrical openings 147, 148 of successively reduced diameter. This will accept the intermediate cylindrical portion 103 and the large diameter rear cylindrical portion 86 of the soldering tip 95. The solder tip portion 86 is retained by the shoulder formed between the cylindrical openings 147, 148 of the collar 145. The assembled structure 150 is illustrated in FIG. 30.

The locking collar 145 may consist of any metal which conducts heat well such as copper or aluminum. As previously explained, the collar 145 may be plated with nickel or chromium or with both nickel and chromium. The locking collar 145 operates as a heat accumulator for the purpose previously described.

Figure 31:
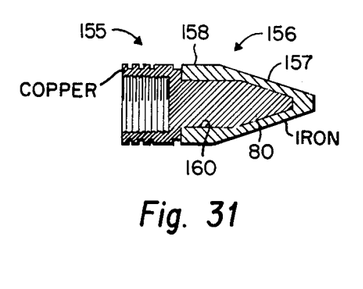
FIG. 31 is a cross-sectional view of a solder tip in accordance with the present invention similar to the one shown in FIG. 13 but having a steel cap of non-uniform thickness.

It may be advantageous for certain purposes to provide a cap for the copper solder core having a variable thickness. Where the cap is relatively thin, the heat transfer from or to the copper core is facilitated. On the other hand, where the thickness of the cap is larger the resulting laminated or composite structure is mechanically stronger. Such a tip 155 is illustrated in FIG. 31. This tip is generally similar to that shown in FIG. 13 and again has a copper core 80 as previously described. However, the steel cap or jacket 156 has a thin forward portion 157 and a relatively thicker rearward portion 158 which may form a cylindrical opening 160.

As a result the heat transfer to the tip portion 157 of the solder tip is facilitated; at the same time the rearward portion 158 is made mechanically stronger.

As indicated in dotted lines in FIG. 17, the steel jacket 161 again may have a thicker or stronger rear portion 162 for the same purpose. A similar construction is shown in FIG. 18 where again the rearward portion 103 of the steel cap may be made thicker as shown at 164. FIG. 25 again shows a similar construction where the steel cap 124 may have a larger rearward portion 165 which again forms a straight cylindrical opening 166. Finally, the laminated structure of FIG. 27 may have a steel cap 140 with a thicker or reinforced rear portion 168.

It will be understood that the construction shown in dotted lines and in FIG. 31 and previously discussed is optional and that it may be sufficient for many purposes to provide a cap of uniform thickness.

Figure 32:
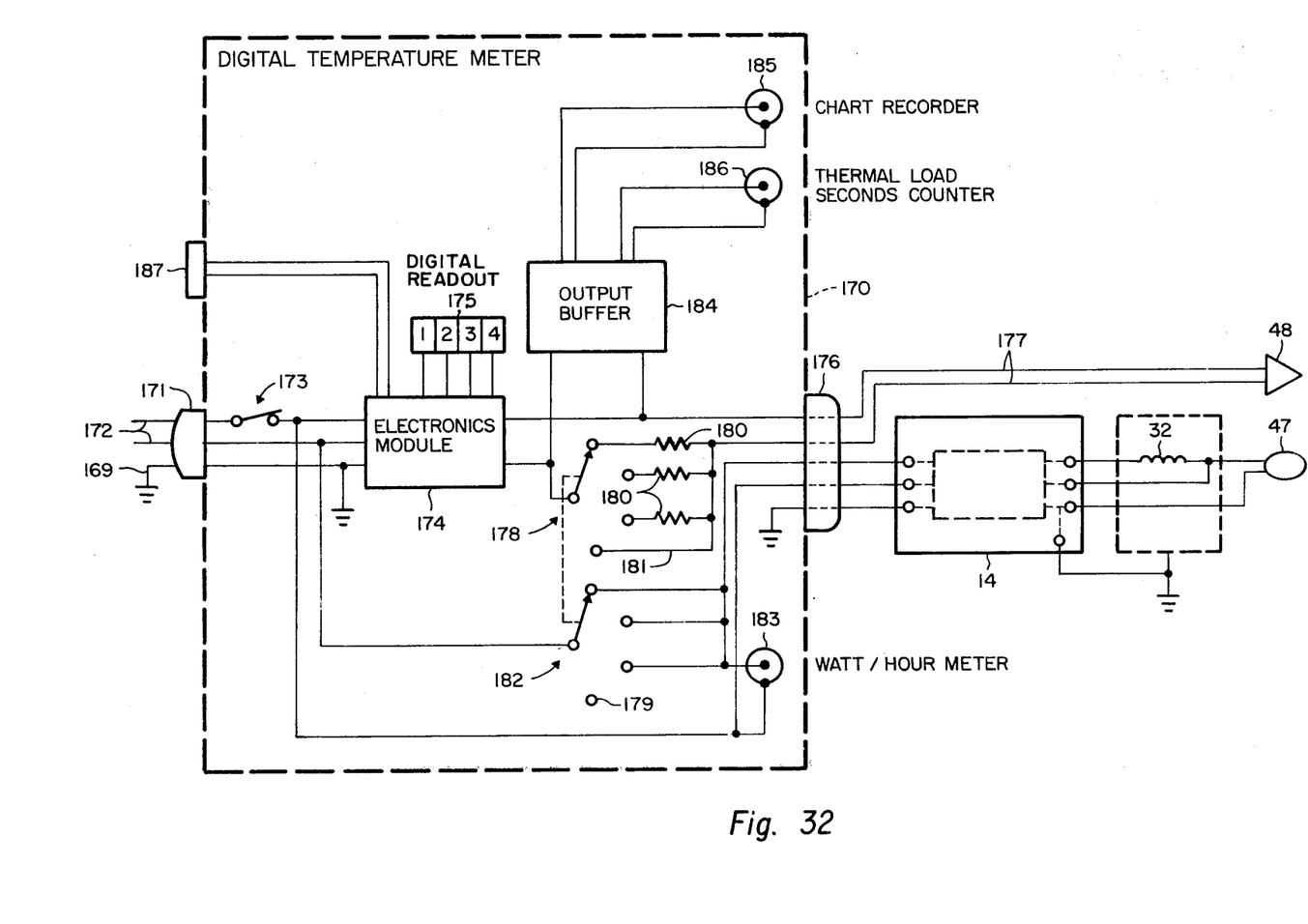
FIG. 32 is a circuit diagram, partly in block form, to illustrate the use of the soldering instrument of the present invention as a temperature probe and for varying the sensitivity of the temperature readout in accordance with different types of tips.

In some cases, it may be desirable to use the temperature controlled instrument of the type illustrated in FIG. 1 as a temperature probe, that is for simply measuring the temperature of a solder connection or similar hot objects. In addition, it may be desired to vary the sensitivity of the temperature display. How this can be effected is illustrated in FIG. 32.

There is illustrated a digital temperature meter shown in box 170 for providing a digital temperature readout. The power may be connected by a plug 171 having two power leads 172 and a ground connection 169. The power may be turned on and off by the switch 173 which interrupts one of the power leads 172. An electronic module 174 is provided which will convert the voltage received from a temperature sensor into a digital readout as shown at 175.

The digital temperature meter is connected by another plug 176 to a temperature controlled instrument of the type illustrated in FIGS. 1 and 5. Thus, the plug 176 connects to the circuit board 14 as shown in FIGS. 1 and 5. The heater element illustrated schematically at 32 may again be provided with a thermistor 47 for controlling the temperature of the instrument and a thermocouple 48 for measuring the temperature at the tip.

The thermocouple 48 has a pair of leads 177 which connect through the plug 176 into the electronics module 174 through a switch 178 having a switch arm which may be connected to a set of graduated resistors 180 each having a different resistance or directly through lead 181.

Hence by rotating the switch arm of switch 178 more of less resistance may be connected into the circuit consisting of the leads 177 and the thermocouple 48. In this manner the sensitivity of the electronics module 174 may be varied depending on the type of solder tip that is being used.

There may also be provided another switch 182 ganged to the switch 178 as shown which connects the input power leads 172 to a watt/hour meter 183 and through the plug 176 to the circuit board 14.

When it is desired to utilize the instrument as a temperature probe the solder tip is removed and both switches 178 and 182 are rotated clockwise so that the switch arm of switch 178 connects to lead 181 while the switch arm of switch 182 connects to contact 179, thereby to disconnect the watt/hour meter. This will also disconnect the power to the circuit board 14.

There may also be provided an output buffer 184 connected to the input of the electronics module 174, thereby to obtain a digital temperature readout from the auxiliary thermocouple.

Figure 33:
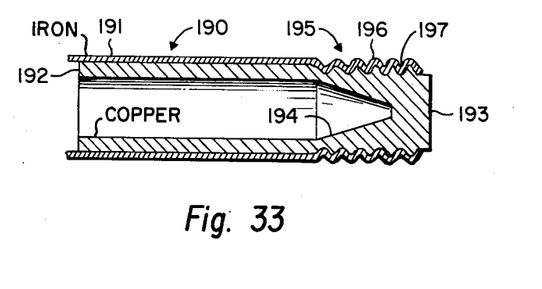
FIG. 33 is a cross-sectional view of a laminated sleeve or sheath for the heater element and provided with special rolled threads.
Figure 34:
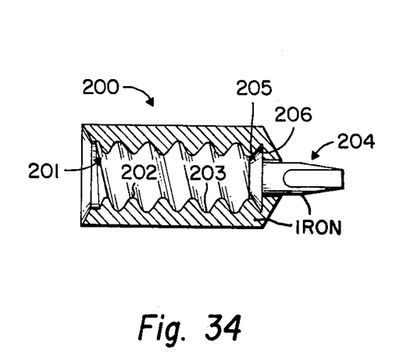
FIG. 34 is a cross-sectional view of a holding collar in accordance with the present invention for holding a soldering tip to the sheath of the heater element.

In connection with FIGS. 2 - 4 there was disclosed and illustrated an embodiment of the invention which facilitates removal of the solder tip from the sleeve or sheath of the heater element. Another construction which will also facilitate removal of the solder tip and prevent damage to the heater element is illustrated in FIGS. 33 - 34 to which reference is now made. Thus FIG. 33 illustrates at 190 a modified composite sheath or sleeve for the heater element. It consists of an outer cylindrical sleeve 191 which preferably consists of stainless steel and an inner copper cylinder 192, the two forming a composite or laminated structure. The forward end of the sleeve 190 is closed by a copper core portion 193 having a conical inner opening 194. Preferably, the two elements 191 and 192 are so made that they provide a close fit.

Both elements are now threaded together as shown at 195. The threads 195 are specially designed to have a rounded shape as shown at 196. This permits to keep the inner diameter 197 as large as possible to improve the heat flow forward to the soldering tip. On the other hand, the stainless steel is substantially corrosion proof and permits easy removal of the soldering tip even after long usage. The threads 195 are preferably rolled. The high point 196 of the threads is thicker to add maximum strength to the thread. The radiuses of the high portions 196 and the low portions 197 are such that they do not substantially stress the stainless steel sleeve or the laminate. It will be understood that a solder tip such as shown at 42 in FIG. 2 may be threaded onto the threads 195.

Instead of threading the solder tip directly to the structure of FIG. 33 it is feasible to utilize a holding collar such as previously discussed in connection with, for example, FIG. 20. Such a holding collar 200 is illustrated in FIG. 34. It is provided with internal rolled threads 201. The holding collar is made to release easily from a stainless steel sleeve of the type illustrated in FIGS. 2 - 4. The lower portion of radius 202 of the threads is weaker than the higher portion 203 and hence would tend to strip first. It will be realized that ordinarily stripping of the threads will not occur. If the holding collar 200 is made of stainless steel, seizure is very unlikely. The soldering tip 204 is provided with an enlarged cylindrical portion 205 at its rear end which is retained by the shoulder 206 of the holding collar 200.

Figure 35:
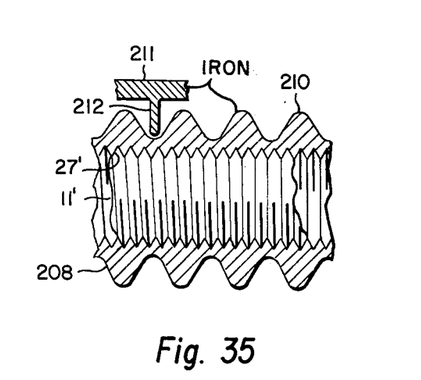
FIG. 35 is a cross-sectional view of an adaptor bushing for adapting a threaded element to a holding collar of the type illustrated in FIG. 34, the adaptor bushing having rolled threads.

In some cases it may be desirable to provide an adaptor for the normal thread of the stainless steel sleeve or sheath 11 as shown in FIGS. 2 - 4. Such an adaptor is shown in FIG. 35. The original portion of the sleeve is shown at 11' having threads 27'. The adaptor bushing 208 threads over the threads 27' and is provided on its outside with the rolled threads 210 as discussed in connection with FIGS. 33 and 34. A portion of a holding collar 211 is also shown in FIG. 35 and this holding collar may be identical with the holding collar 200 of FIG. 34. It is shown with threads 212 which are relatively pointed and thin so that they will easily strip from the holding collar. This adaptor will facilitate converting a tool having ordinary threads to the rolled threads illustrated in FIGS. 33 and 34.

The constructions shown in FIGS. 33 - 35 have the following advantages. The outer sheath provides greater mechanical strength and the threads have a long life. The heat path from the heater element to the soldering tip is relatively large to provide for rapid transfer of heat. The construction will solve the tip seizure problem and permit the use of thin, high-heat soldering elements. The threads are characterized by high resistance to corrosion and by minimum seizure of the threads. The radius of the threads has a low profile. The rolled threads shown can be economically manufactured in mass production. Finally, during the installation and removal of the tip the heater element suffer substantially no stress.

There has thus been disclosed an improved soldering instrument. The new soldering instrument features an improved sleeve for the heater element which facilitates removal of the soldering tip even after long use. This is accomplished by the provision of a special nut made integral with the sleeve so that the tip can be readily removed without damaging the heater element. Furthermore, the heater may be provided with one or more sensors which permit a display of the temperature. The sensitivity of the heater may be varied in accordance with the type of tip utilized and various readouts may be provided. A new process has been disclosed for manufacturing laminated solder tips and for shaping them into any desired shape, for example, by hammering or peening the laminated structure. The thin-walled steel cap of the structure may either be made of uniform thickness or non-uniform thickness to facilitate heat transfer at the forward end and to provide greater mechanical strength at the rearward end. Another construction of the heater element sleeve features rolled threads to also facilitate removal of the solder tip and better heat transfer thereto.

What is claimed is:

1. In a soldering instrument:
    a substantially cylindrical, thin-walled stainless steel sheath having a reduced diameter front end formed with both internal and external threads which are coaxial with said sheath and having hexagonal nut formed integrally with its rear portion;
    a substantially cylindrical, highly heat conductive heater cartridge disposed coaxially within said sheath and an externally threaded front end threadingly engaged with said internal threads of said sheath;
    an internally threaded soldering tip disposed in threaded engagement over said external threads of said sheath whereby
    said front end of said heater cartridge and the threaded portion of said soldering tip are axially coincident and in high thermal energy flow relationship with each other; and
    a heater element of the character to be electrically energized disposed within said cartridge in direct thermal contact therewith.

2. The invention according to claim 1 in which said cartridge is axially shorter than said sheath and which is provided with insertion tool engaging means disposed contiguously to its rear portion for providing threading torque thereto.

3. The invention according to claim 2 in which said insertion tool engaging means comprises a rearwardly converging conical surface for frictionally engaging an external insertion tool.

* * * * *